(12) United States Patent
Negi et al.

(10) Patent No.: US 12,190,138 B2
(45) Date of Patent: Jan. 7, 2025

(54) CONTINUOUS INTEGRATION EMULATOR

(71) Applicant: SAP SE, Walldorf (DE)

(72) Inventors: Anurag Negi, Pauri Garhwal (IN);
Krishna Prasad P, Kasaragod (IN);
Abhinav Srivastava, Gorakhpur (IN)

(73) Assignee: SAP SE, Walldorf (DE)

( * ) Notice: Subject to any disclaimer, the term of this patent is extended or adjusted under 35 U.S.C. 154(b) by 74 days.

(21) Appl. No.: 17/986,707

(22) Filed: Nov. 14, 2022

(65) Prior Publication Data
US 2024/0160459 A1 May 16, 2024

(51) Int. Cl.
*G06F 9/455* (2018.01)
*G06F 9/38* (2018.01)
*G06F 11/07* (2006.01)

(52) U.S. Cl.
CPC ........ *G06F 9/45508* (2013.01); *G06F 9/3867* (2013.01); *G06F 11/0793* (2013.01)

(58) Field of Classification Search
None
See application file for complete search history.

(56) References Cited

U.S. PATENT DOCUMENTS

| | | | |
|---|---|---|---|
| 11,537,400 B1 * | 12/2022 | Zhang | G06F 8/31 |
| 11,675,583 B2 * | 6/2023 | Roy | G06F 8/73 717/123 |
| 11,726,854 B2 * | 8/2023 | Bregman | G06F 11/3409 714/48 |
| 2020/0104246 A1 * | 4/2020 | Bhatt | G06F 11/3692 |
| 2022/0342685 A1 * | 10/2022 | Tripathy | G06F 11/3055 |
| 2023/0168996 A1 * | 6/2023 | Bregman | G06F 11/3696 717/124 |
| 2023/0409305 A1 * | 12/2023 | Bregman | G06F 8/60 |
| 2024/0036962 A1 * | 2/2024 | Damjakob | G06F 11/079 |

OTHER PUBLICATIONS

Damjakob, "System and method for product/service discovery and lifecycle management", Jul. 2022, U.S. Appl. No. 63/393,641 (Year: 2022).*
Roy, "Using Continuous Deployment techniques to manage software change at a WLCG Tier-2", 2019, Journal of Physics: Conference Series (Year: 2019).*

* cited by examiner

*Primary Examiner* — Hossain M Morshed
(74) *Attorney, Agent, or Firm* — Mintz Levin Cohn Ferris Glovsky and Popeo, P.C.

(57) ABSTRACT

A method for implementing a continuous integration emulator includes receiving, by a continuous integration emulator running locally on a client device, a modification to code of a continuous integration pipeline running on a continuous integration server in communication with the client device. The method includes parsing at least a portion of the code of the continuous integration pipeline. The method includes determining at least one programming language construct of at least the parsed portion of the code of the continuous integration pipeline. The method includes executing the at least one programming language construct including the modification. The method includes indicating, by the continuous integration emulator and via the client device, whether the modification is successful. Related systems and articles of manufacture are provided.

20 Claims, 9 Drawing Sheets

300

```
pipeline {
302→  agent { docker { image 'ruby:3.0.3-alpine' } }
304→  stages {
        stage ( 'Example Build' ) {
          agent { docker 'maven:3.8.1-adoptopenjdk-11' }
306→      steps {
            // echo 'Hello, Maven'
            sh 'mvn --version'
            'A dummy string'
            //  Mohan     You,  2 month ago • code(example):  added example _
          }
        }
        stage ( 'Example Test' ) {
304→      agent {
            docker {
              image 'myregistry.com/node'
              label 'my-defined-label'
              registryUrl 'https://myregistry.com/'
              registryCredentialsId 'myPredefinedCredentialsInJenkins'
            }
          }
306→      steps {
            // echo 'Hello, JDK'
            Sh 'java --version'
            fun( )
            testfun(arg1,arg2)
          }
        }
304→    stage( 'Versioning' ) {
          parallel {
            stage( 'Check Commit Convention' ) {
306→          steps {
308→            script {
                  //new aif . SemanticVersion(this).checkCommitConvention( )
                  sh 'ls -la '
                }
```

```
grammar JenkinsEmulator;
/* The start rule. Begin parsing here. */
pipeline: 'pipeline' CURLYOPEN agentBody stagesBody CURLYCLOSE groovyFunDef*;

agentBody: 'agent'  agentExpression
    |    ;

agentExpression: NONE
    |    ANY
    |    agentNodename
    |    agentBlock
    |    ;

agentNodename: DQUOTE ID DQUOTE
    |    ;
```

```
Groovy code detected.
Yaml code detected.
Groovy code detected.

Running Stage --------- [Example Mvn] ---------
Executing Command: [mvn – version]
OS is: Mac OS X
Workspace path: /Users/Desktop/atestpipelines Running Stage --------- [Example Java] ---------
Executing Command: [java -- version]
OS is: Mac OS X
Workspace path: /Users/Desktop/atestpipelines
openjdk 13.0.2 2020-01-14
OpenJDK Runtime Environment AdoptOpenJDK (build 13.0.2+8)
OpenJDK 64-Bit Server VM AdoptOpenJDK (build 13.0.2+8, mixed mode, sharing Running Parallel Stage --------- [Versioning] ---------

Running Stage --------- [Example List] ---------
Executing Command:     [ls -la]
OS is: Mac OS X
```

FIG. 6

CONTINUOUS INTEGRATION EMULATOR

TECHNICAL FIELD

The subject matter described herein relates generally to continuous integration pipelines and more specifically to a continuous integration emulator.

BACKGROUND

Continuous integration and continuous delivery (CI/CD) drives software development through building, testing, and deploying code. In continuous integration, code changes are generally merged in a central repository. Each change in code triggers a build-and-test sequence for the given project, providing feedback to developers in building the code. Continuous delivery includes infrastructure provisioning and deployment, which may include multiple stages.

SUMMARY

Systems, methods, and articles of manufacture, including computer program products, are provided for a Continuous Integration emulator. In one aspect, there is provided a system. The system may include at least one data processor and at least one memory. The at least one memory may store instructions that result in operations when executed by the at least one data processor. The operations may include: receiving, by a continuous integration emulator running locally on a client device, a modification to code of a continuous integration pipeline running on a continuous integration server in communication with the client device. The operations may also include parsing, by the continuous integration emulator, at least a portion of the code of the continuous integration pipeline. The operations may also include determining, by the continuous integration emulator, at least one programming language construct of at least the parsed portion of the code of the continuous integration pipeline. The operations may also include executing, by the continuous integration emulator and locally at the client device, the at least one programming language construct including the modification. The executing emulates running of at least the portion of the code of the continuous integration pipeline on the continuous integration server. The operations further include indicating, by the continuous integration emulator and via the client device, whether the modification is successful.

In some variations, the operations further include: determining a programming language type of the code of the continuous integration pipeline. The parsing may be based on the programming language type.

In some variations, the operations further include: generating a schematic representation of the continuous integration pipeline based at least on the parsed portion of the code of the continuous integration pipeline and the executing, and displaying the schematic representation at the client device.

In some variations, the determined at least one programming language construct is containerized for execution.

In some variations, the operations further include: identifying an error in the code of the continuous integration pipeline; and generating a recommendation for correcting the error.

In some variations, at least one programming construct includes at least one process to be invoked by the continuous integration emulator.

In some variations, the operations further include: updating the continuous integration pipeline running on the continuous integration server to include the modification based on a determination that the modification is successful.

In some variations, a computer-implemented method includes: receiving, by a continuous integration emulator running locally on a client device, a modification to code of a continuous integration pipeline running on a continuous integration server in communication with the client device. The method also includes parsing, by the continuous integration emulator, at least a portion of the code of the continuous integration pipeline. The method may also include determining, by the continuous integration emulator, at least one programming language construct of at least the parsed portion of the code of the continuous integration pipeline. The method may also include executing, by the continuous integration emulator and locally at the client device, the at least one programming language construct including the modification. The executing emulates running of at least the portion of the code of the continuous integration pipeline on the continuous integration server. The method further includes indicating, by the continuous integration emulator and via the client device, whether the modification is successful.

In some variations, a non-transitory computer-readable medium storing instructions, which when executed by at least one data processor, result in operations including: receiving, by a continuous integration emulator running locally on a client device, a modification to code of a continuous integration pipeline running on a continuous integration server in communication with the client device. The operations may also include parsing, by the continuous integration emulator, at least a portion of the code of the continuous integration pipeline. The operations may also include determining, by the continuous integration emulator, at least one programming language construct of at least the parsed portion of the code of the continuous integration pipeline. The operations may also include executing, by the continuous integration emulator and locally at the client device, the at least one programming language construct including the modification. The executing emulates running of at least the portion of the code of the continuous integration pipeline on the continuous integration server. The operations further include indicating, by the continuous integration emulator and via the client device, whether the modification is successful.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts an example portion of code of a continuous integration pipeline, in accordance with some example embodiments;

FIG. 4 depicts example grammar for parsing code of a continuous integration pipeline, in accordance with some example embodiments;

FIG. 6 depicts an example execution of a programming language construct, in accordance with some example embodiments;

When practical, similar reference numbers denote similar structures, features, or elements.

DETAILED DESCRIPTION

Figure 1:
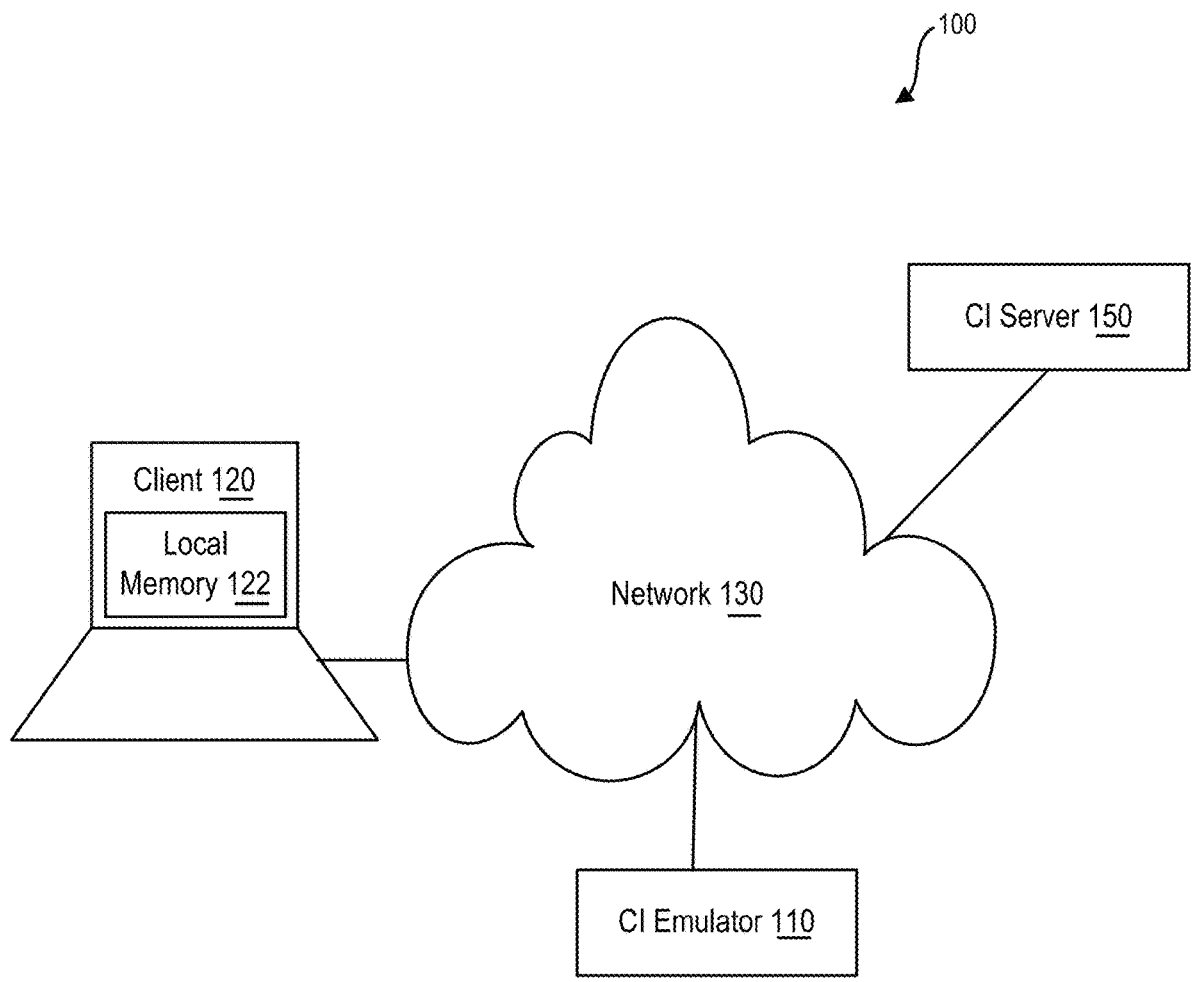
FIG. 1 depicts a system diagram illustrating a continuous integration system, in accordance with some example embodiments.

Applications, such as cloud products, may follow a continuous integration (CI) paradigm for building, testing, and deploying code. Changes to the code can be verified using continuous integration tooling. For example, in continuous integration, code changes are merged in a central repository. Each change in code may trigger a build-and-test sequence for the given project, providing feedback to developers in building the code.

Continuous integration servers, such as Jenkins, Azure, and/or the like, can be used when building and testing the code for the application. A continuous integration pipeline may be used to configure the continuous integration servers. Continuous integration pipelines include code for processes that run in the background and test all aspects of a product during building and/or prior to deployment. However, continuous integration tools used for generating and executing the continuous integration pipelines to configure continuous integration servers are generally very costly. For example, instances of continuous integration tools are generally purchased and installed on local devices during configuration of the continuous integration servers and consume a large amount of memory at the local device. Execution of the continuous integration tools may also depend on available local memory and network capabilities, as the continuous integration tools generally consume a large amount of bandwidth during execution.

Moreover, even small modifications made in the continuous integration pipeline can be computationally expensive based on the high memory usage and network resource consumption of continuous integration tools and servers. For example, even for minor modifications, the corresponding continuous integration server and/or tool is generally downloaded to the local device. Once downloaded, and the modifications to the code of the continuous integration pipeline are submitted, all steps and processes of the continuous integration pipeline are executed to verify the validity of the code. In some instances, running the entire pipeline to test the code can be time consuming, ranging from several minutes to 20-50 minutes or greater. Thus, deploying continuous integration tools to configure continuous integration servers and modify code of the underlying continuous integration pipeline may be computationally expensive and inefficient.

In contrast, the continuous integration system, consistent with embodiments of the current subject matter, is computationally inexpensive, efficient, highly extendable, and/or highly configurable. The continuous integration system described herein may additionally and/or alternatively reduce the amount of time to modify the code of the continuous integration pipeline for testing an application or product, such as a cloud product prior to deployment and/or reduce memory consumption for testing or modifying the code. The continuous integration system described herein may additionally and/or alternatively be continuous integration tool-agnostic, improving the extendibility of the continuous integration system.

In particular, the continuous integration system described herein may implement a continuous integration emulator running locally on a client device. The continuous integration emulator may receive a modification to code of a continuous integration pipeline running on a continuous integration server in communication with the client device. The continuous integration emulator may parse at least a portion of the code of the continuous integration pipeline. The continuous integration emulator may also determine at least one programming language construct of at least the parsed portion of the code of the continuous integration pipeline and execute the at least one programming language construct including the modification. The continuous integration emulator may indicate whether the modification is successful.

For example, the continuous integration system consistent with embodiments of the current subject matter may include a compact and local pipeline editor (e.g., the continuous integration emulator) for rapidly executing, visualizing and syntax linting continuous integration pipelines. The continuous integration emulator includes customized grammar for an identified programming language type of the code of the continuous integration pipeline being tested and parses, via a generated parser of the continuous integration emulator, at least a portion of the code based on the identified programming language type, to generate a parse tree for the continuous integration pipeline. Based on the parse tree (e.g., the parsed portion of the code), the continuous integration emulator may determine the language constructs in at least the portion of the code. The continuous integration emulator may create a containerized run-time for the identified language, and at least the parsed portion of the code. Thus, the continuous integration emulator maintains a local workspace and run-time environment for the selected code and runs the corresponding code in a containerized environment that can be extended to various programming language types. Accordingly, the continuous integration emulator may locally emulate execution of at least a portion or all of the continuous integration pipeline running on the continuous integration server, such as without use of the continuous integration server.

FIG. 1 depicts a network diagram illustrating a continuous integration system 100, in accordance with some example embodiments. Referring to FIG. 1, the continuous integration system 100 may include a continuous integration emulator 110, a continuous integration server 150, and one or more client devices 120. The continuous integration emulator 110, the continuous integration server 150, and the one or more client devices 120 may be communicatively coupled via a network 130. The network 130 may be any wired network and/or a wireless network including, for example, a wide area network (WAN), a local area network (LAN), a virtual local area network (VLAN), a public land mobile network (PLMN), the Internet, and/or the like. Although the continuous integration system 100 is shown as a remote and/or cloud platform, it should be appreciated that the continuous integration system 100 may additionally or alternatively be deployed as computer software and/or dedicated circuitry (e.g., application specific integrated circuits (ASICs)) on the client device without departing from the scope of the present disclosure.

The continuous integration server 150 may be used to build, test, and/or deploy code for an application, such as via a browser, or other software program running on the one or more client devices 120. As described herein, the application may include a mobile and/or web application, an application service, a cloud service, and/or the like. The continuous integration server 150 may be in communication, such as via the network 130, with the one or more client devices 120. As noted, the continuous integration server 150 may be configured by a continuous integration pipeline using a continuous integration tool. Further, as noted, continuous integration pipelines include code for processes that run in the background and test all aspects of a product during building and/or prior to deployment.

The one or more client devices 120 may be a processor-based device including, for example, a smartphone, a tablet computer, a wearable apparatus, a virtual assistant, an Internet-of-Things (IoT) appliance, and/or the like. The one or more client devices 120 may include a local memory 122. The continuous integration emulator 110 may include at least one processor and/or at least one memory storing instructions configured to be executed by the at least one processor. The continuous integration emulator 110 may execute or otherwise implement one or more aspects of the continuous integration system 100, consistent with embodiments of the current subject matter. The continuous integration emulator 110 may, for example, run on the one or more client devices 120. The continuous integration emulator 110 and/or one or more features of the continuous integration emulator 110 may be stored in the local memory 122 of the one or more client devices 120. In some embodiments, the continuous integration emulator 110 may locally execute at least a portion of the continuous integration pipeline without use of the continuous integration server 150 or continuous integration tool and/or without storage of the continuous integration tool in the local memory 122 of the one or more client devices 120. Thus, the continuous integration emulator 110 described herein may reduce computational, memory, and networking resources for testing, building, and deploying code.

Figure 2:
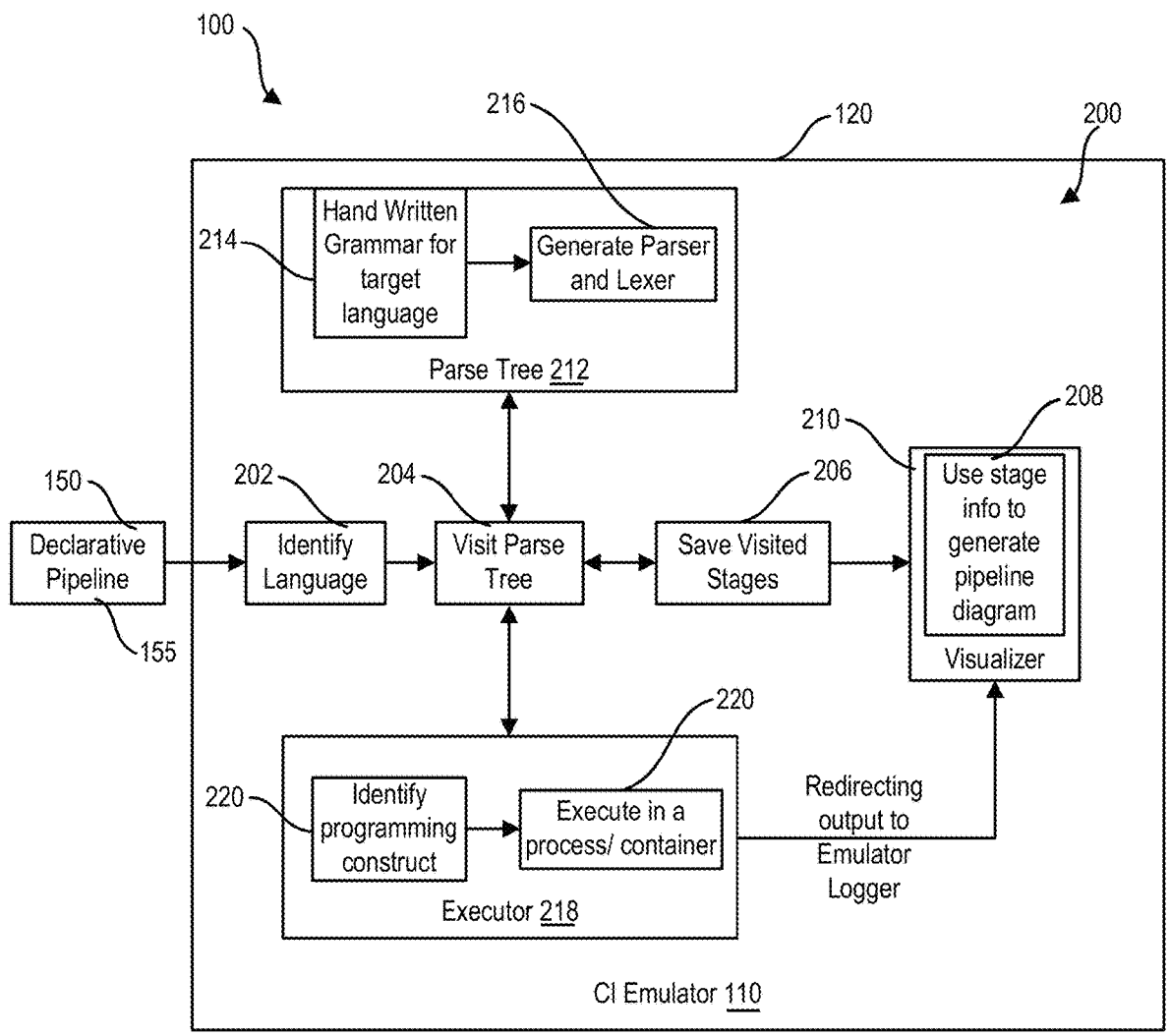
FIG. 2 depicts a block diagram illustrating an example implementation of the continuous integration system, in accordance with some example embodiments.

FIG. 2 depicts a block diagram illustrating an example schematic diagram 200 including a workflow for the continuous integration system 100, in accordance with some example embodiments. As shown in the diagram 200, the continuous integration system 100 includes a continuous integration pipeline 155 for configuring the continuous integration server 150. The continuous integration system 100 also includes the continuous integration emulator 110 running locally at the one or more client devices 120.

As noted herein, the continuous integration pipeline 155 may include code for configuring the continuous integration server 150. The continuous integration server 150 listens for commits to the code on the master branch of the continuous integration pipeline 155 and triggers execution of the continuous integration pipeline 155 when a change is made to test the modification. This ensures that each commit of code is verified and tested. However, as described herein, executing the entire continuous integration pipeline 155 to verify and test modifications to the code can be costly. An example of at least a portion of code 300 of the continuous integration pipeline 155 is shown in FIG. 3. Referring to FIG. 3, the code of the continuous integration pipeline 155 includes the various processes that are run as part of executing the continuous integration pipeline to verify and test the code. For example, as shown in FIG. 3, at least the portion of the code 300 includes an agent 302, one or more stages 304 that can be executed in series or parallel, one or more steps 306, one or more scripts 308, and/or the like. As noted, each of the processes of the continuous integration pipeline 155 shown in the code 300 may be executed to test each modification to the code 300.

The continuous integration emulator 110 running locally, such as in the local memory 122, at the client device 120, may emulate at least a portion of the execution of the continuous integration pipeline 155 to verify and/or test modifications to the code. The continuous integration emulator 110 may receive at least a portion (or all of) the code 300 of the continuous integration pipeline 155. The code 300 may be stored locally, such as at the local memory 122.

Referring back to FIG. 2, at 202, the continuous integration emulator 110 identifies a programming language type of the code 300. In other words, the continuous integration emulator 110 determines a programming language type of the programming language used to generate the code 300 of the continuous integration pipeline 155. The programming language type may be a markup language used for write the code. For example, the continuous integration emulator 110 may identify the programming language type as Groovy, YAML, and/or the like. The programming language type may be considered to be a target language for further processing by the continuous integration emulator 110. Additionally and/or alternatively, the continuous integration emulator 110 may determine the type of the continuous integration pipeline 155. The type of the continuous integration pipeline 155 may be, for example, a scripted or declarative pipeline built in Jenkins, Azure, and/or the like.

The continuous integration emulator 110 may parse the code 300 to generate a parse tree 212 based at least on the programming language type and/or the type of the continuous integration pipeline 155. For example, at 204 (see FIG. 2), the continuous integration emulator 110 may visit the parse tree 212. The continuous integration emulator 110 may include a parser and/or a lexer, or may be coupled to a parser and/or a lexer, for generating the parse tree 212.

For example, at 214, customized grammar may be generated for each target language (e.g., the programming language type) of the code (or at least a portion of the code) 300. FIG. 4 depicts example customized grammar 400 (e.g., script) for parsing the code 300 of the continuous integration pipeline 155, in accordance with some example embodiments. The customized grammar 400 may correspond to a particular programming language type. In other words, each customized grammar 400 may be generated and used to parse at least a portion of the code 300 having a corresponding programming language type. The customized grammar 400 may include one or more rules for parsing at least the portion of the code 300. For example, the customized grammar 400 may include a start rule indicating, in at least the portion of the code 300, where to begin parsing. This helps to indicate a particular portion of the code 300, such as the portion including the modification for testing, to be parsed and executed.

Figure 5:
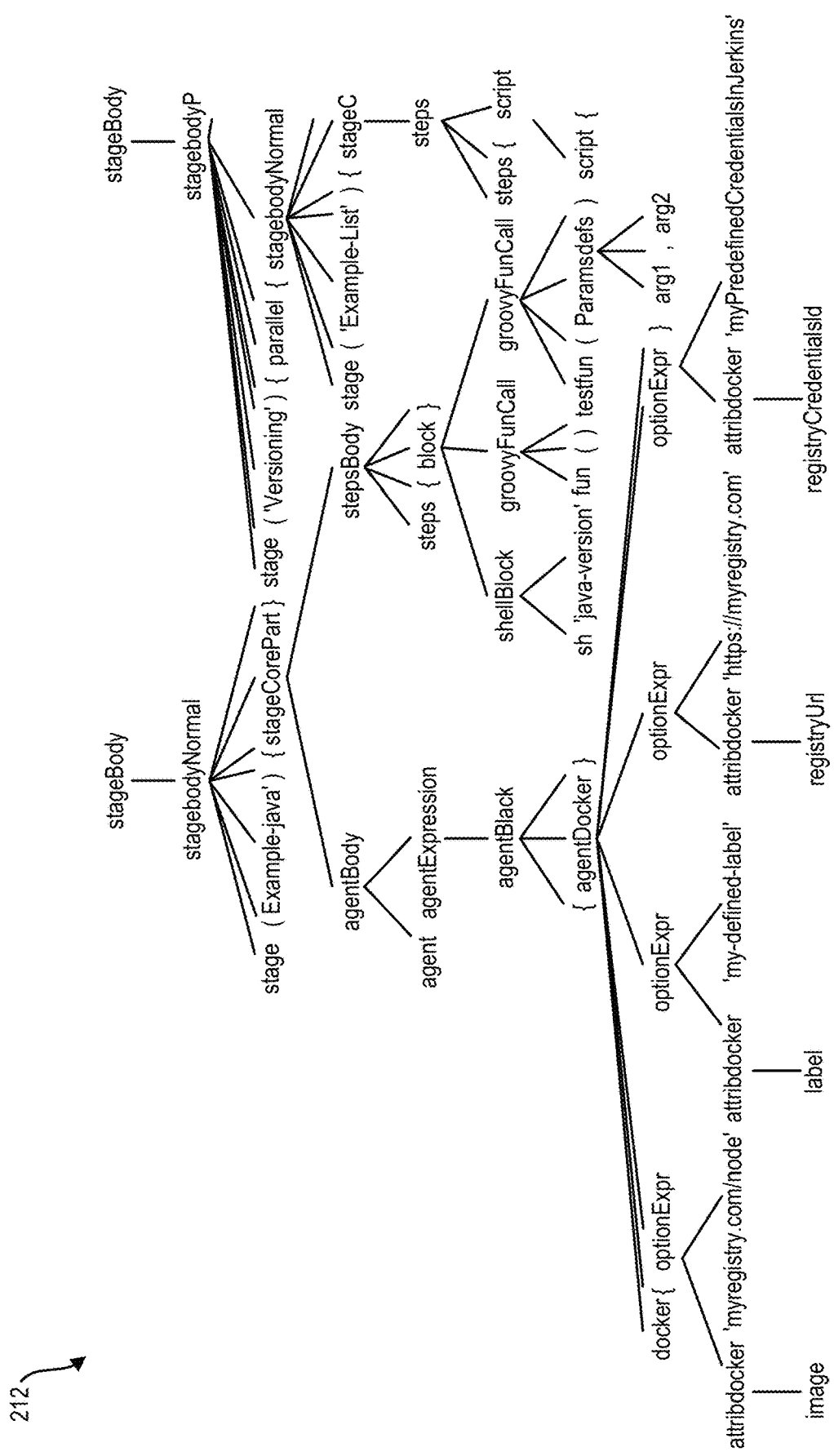
FIG. 5 depicts an example parse tree, in accordance with some example embodiments.

The customized grammar 400 may be used by the parser or lexer to generate the parse tree 212, such as at 216. FIG. 5 depicts a portion of an example parse tree 212, in accordance with some example embodiments. The parse tree may be a syntax tree, such as an ordered, rooted tree representing the syntactic structure of at least a portion of the code 300 of the continuous integration pipeline 155. As shown in the parse tree 212, at least the portion of the code 300 has been parsed by the parser (or lexer) at 216. The parse tree 212 includes a plurality of nodes, such as a root node, at least one parent node, at least one child node, and at least one leaf node, and a plurality of branches connecting the plurality of nodes. The branches and nodes of the parse tree 212 may represent the various processes of at least the portion of the continuous integration pipeline 155. The various processes, as described herein may executed in parallel and/or in series.

The parse tree 212 may help to identify parts, stages, and/or the like of at least the portion of the code 300 for later execution. Referring again to FIG. 2, at 206, the parts, stages, and/or the like may be stored in the local memory 122 of the client device 120. As described in more detail below, the continuous integration emulator 110 may use the stored parts, stages, and/or the like for generation of a schematic representation of at least the portion of the code 300 for display via the client device 120.

In some embodiments, the continuous integration emulator 110 includes an executor or execution engine 218. The execution engine 218 may, at 220, identify (e.g., determine) at least one programming construct based at least on the parsed portion of the code 300 of the continuous integration pipeline 155. The at least one programming construct includes at least one process to be invoked by the continuous integration emulator 110 during execution. The at least one programming construct may include one or more processes, such as a test, a command, and/or the like used by the continuous integration emulator 110 to test or verify at least the portion of the code 300, such as a target portion that includes the modification. The process may include a shell process or command, a list command, a ping command, a networking services process, a shell process, a shell test, a Python test, and/or the like. As noted, the execution engine 218 may determine whether the at least one programming construct should be executed in series or in parallel with at least one other programming construct identified by the execution engine 218.

At 22, the execution engine 218 may execute the at least one programming construct (e.g., process) determined at 220. The at least one programming construct may be executed by the execution engine 218 in series and/or in parallel based at least on the identification at 220. The execution engine 218 may execute the at least one programming construct locally at the client device 120, such as without communicating with the continuous integration server 150. This reduces the required computational (e.g., memory, bandwidth or networking, etc.) resources used to execute at least the portion of the code 300 of the continuous integration pipeline 155.

In some embodiments, during execution of the at least one programming construct, the execution engine 218 calls the local memory 122 to retrieve the stored parts, stages, and/or the like, for execution. The execution engine 218 may containerize or dockerize the at least one programming language construct for execution. This allows for execution of the at least one programming language construct by the continuous integration emulator 110 on any platform.

In some embodiments, the at least one programming language construct executed by the execution engine 218 includes the modification to the code for testing the modification. Executing the at least one programming language construct emulates running of at least the portion of the code of the continuous integration pipeline 155 on the continuous integration server 150. However, as described herein, the continuous integration emulator 110 locally emulating running of at least the portion of the code 300 may improve computing efficiency.

FIG. 6 depicts an example execution 600 of a programming language construct, in accordance with some example embodiments. As shown in FIG. 6, the type of programming language of at least the portion of the code 300 is detected as Groovy code or Yaml code. The execution engine 218 of the continuous integration emulator 110 may run various stages of at least the portion of the code 300 in series or in parallel, and may execute various processes and/or commands of each stage during execution.

Based at least on the execution of the at least one programming language construct to locally emulate running of at least the portion of the code 300, the continuous integration emulator 110 may indicate whether the modification is successful. For example, the continuous integration emulator 110 may indicate, via the client device 120, whether the modification is successful. In other words, the continuous integration emulator 110 may transmit to and display, via a display of the client device 120, a visual element (e.g., a color, a mask, a highlighting, a text, and/or the like) indicating the success of the modification and/or of the execution of the at least one programming construct.

In some embodiments, the continuous integration emulator 110 identifies an error in at least the portion of the code 300 of the continuous integration pipeline 155. The continuous integration emulator 110 may generate a recommendation for correcting the error. In some embodiments the continuous integration emulator 110 may additionally and/or alternatively generate a recommendation for correcting the modification. For example, the continuous integration emulator 110 may identify an error in the code 300 and/or the modification and/or a location of the error. The continuous integration emulator 110 may cause display of the recommendation via the client device 120.

Based at least on the local execution of the at least one programming construct, the continuous integration pipeline 155 running on and/or configuring the continuous integration server 150 may be updated. For example, the continuous integration pipeline 155 may be updated to include the modification based on a determination that the modification is successful. The continuous integration pipeline 155 may additionally and/or alternatively be updated based on the recommendation generated by the continuous integration emulator 110. In some embodiments, the modification and/or the recommendation is incorporated into at least the portion of the code 300 of the continuous integration pipeline 155 running on the continuous integration server 150 by synching the code processed by the continuous integration emulator 110 with the central repository of the continuous integration pipeline 155. Additionally and/or alternatively, the continuous integration emulator 110 causes the modification and/or the recommendation is incorporated into at least the portion of the code 300 of the continuous integration pipeline 155 running on the continuous integration server 150 by, for example, transmission of an update and/or signal to the continuous integration server 150.

Figure 7:
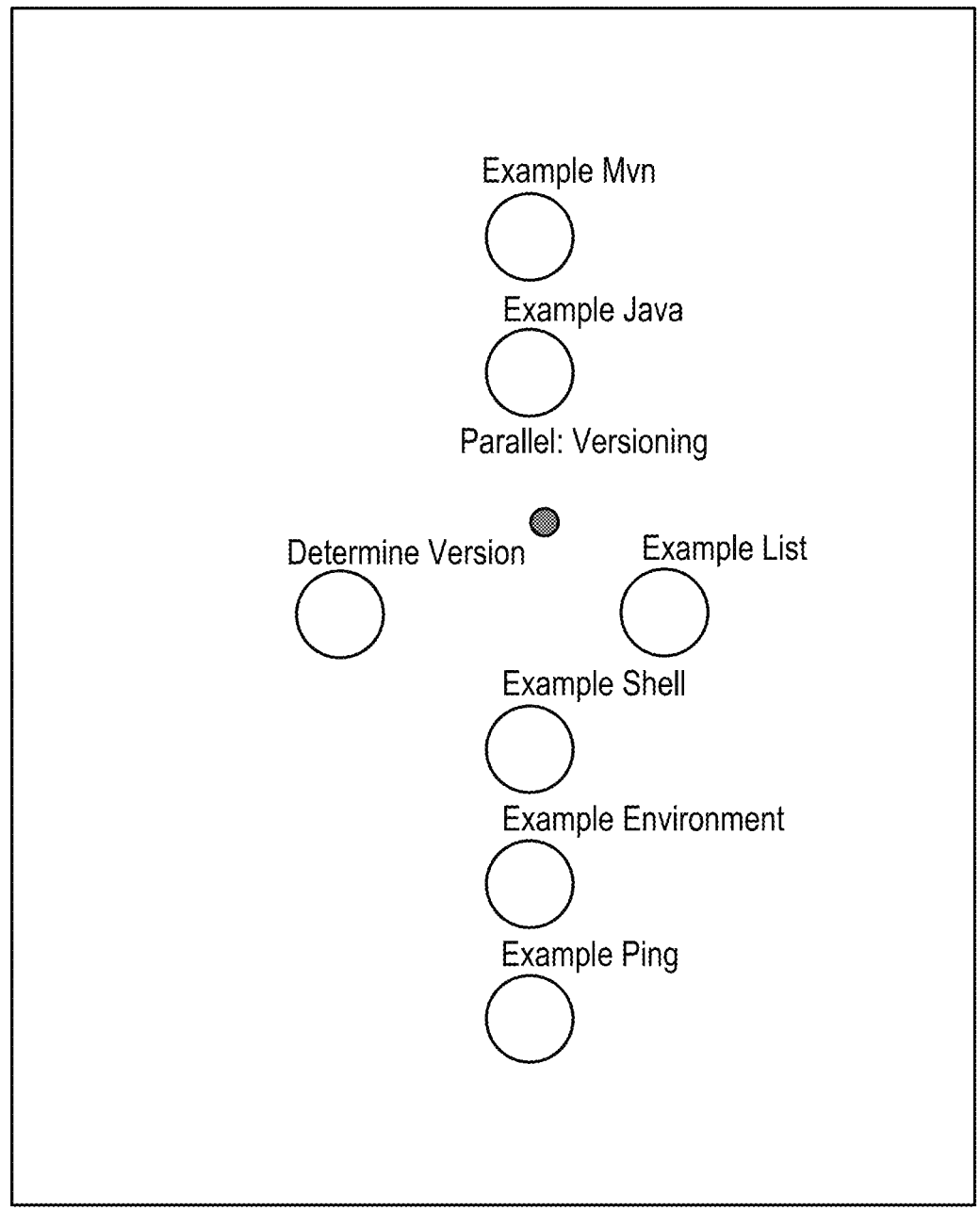
FIG. 7 depicts an example schematic representation, in accordance with some example embodiments.

In some embodiments, the output of the execution by the execution engine 218 is redirected to an emulator logger for storing in the local memory 122 of the client device 120. The output and/or the stored parts, stages, and/or the like stored in the local memory 122, such as at 206, may be used by a visualizer 210 of the continuous integration emulator 110 to generate a schematic representation, at 208 (see FIG. 2). FIG. 7 depicts an example schematic representation 700 generated by the visualizer 210 of the continuous integration emulator 110, in accordance with some example embodiments. The schematic representation 700 schematically depicts the various parts, stages, and/or the like. The schematic representation 700 provides an overview of at least the portion of the code 300 that has been parsed and executed by the continuous integration emulator 110. The schematic representation 700 can be displayed via the client device 120.

Figure 8:
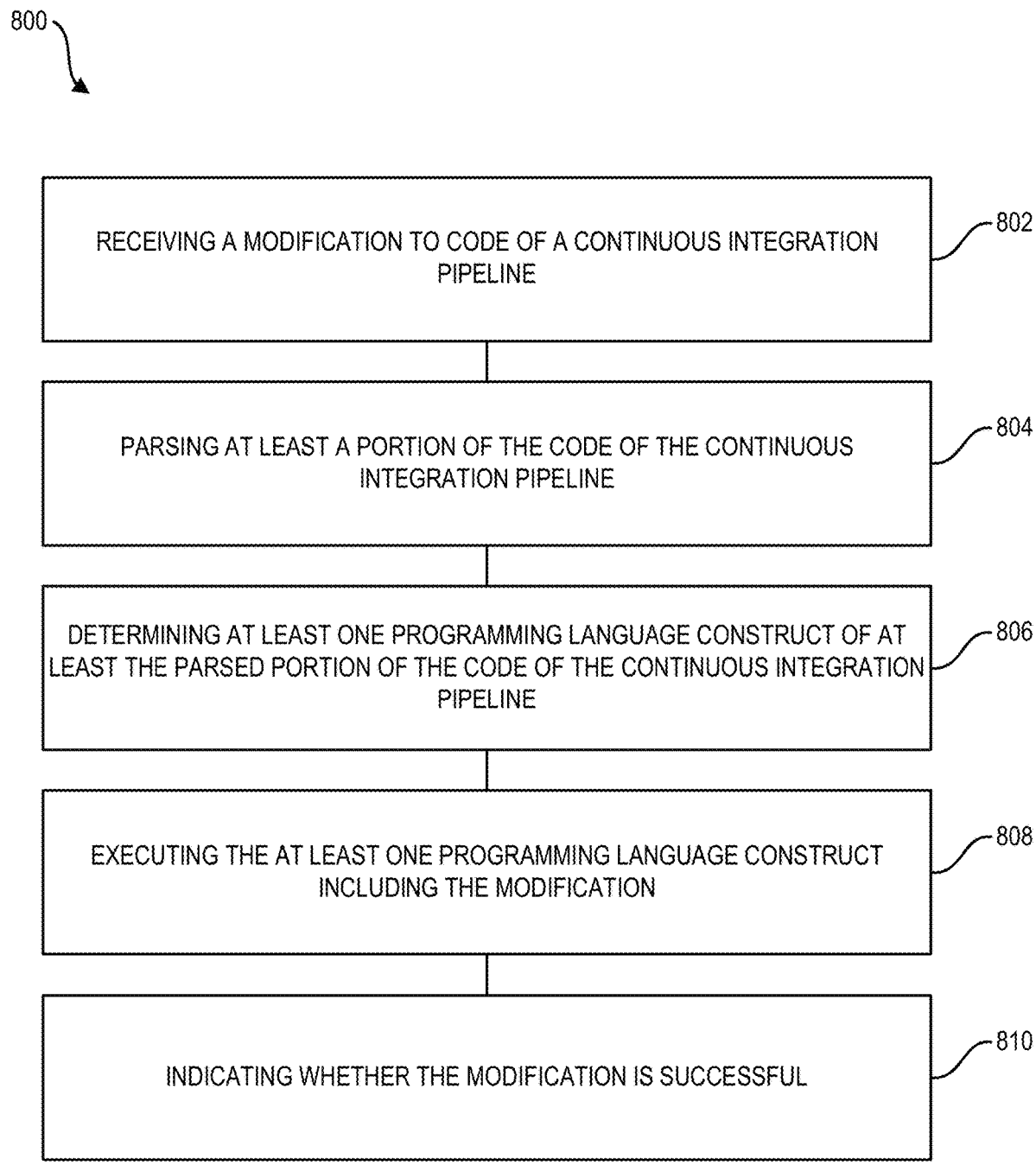
FIG. 8 depicts a flowchart illustrating an example of a process for implementing a continuous integration emulator, in accordance with some example embodiments.

FIG. 8 depicts a flowchart illustrating a process 800 for implementing a continuous integration emulator in accordance with some example embodiments. Referring to FIGS. 1-7, one or more aspects of the process 800 may be performed by the continuous integration system 100, the continuous integration emulator 110, the client device 120 (e.g., the local memory 122), other components therein, and/or the like.

At 802, a continuous integration emulator (e.g., the continuous integration emulator 110) receives a modification to code of a continuous integration pipeline running on a continuous integration server (e.g., the continuous integration server 150). The continuous integration emulator may run locally on a client device (e.g., the client device 120). The continuous integration server may be in communication with the client device.

At 804, the continuous integration emulator may parse at least a portion of the code of the continuous integration pipeline. The continuous integration emulator may determine a programming language type of the code of the continuous integration pipeline, such as the programming language type of the code of at least a portion of the code (e.g., a target portion). For example, the programming language type may include Groovy, YAML, and/or the like. The continuous integration emulator may include a parser that parses at least the portion of the code (e.g., the target portion) based on the determined programming language type of the code of at least the target portion of the continuous integration pipeline.

At 806, the continuous integration emulator determines at least one programming language construct of at least the parsed portion of the code of the continuous integration pipeline. The at least one programming language construct may include at least one process to be invoked or called by the continuous integration emulator. The at least one programming language construct may, in other words, include particular syntax and/or semantics used within at least the parsed portion of the code of the continuous integration pipeline and that represent one or more processes to be executed by the continuous integration emulator during testing of at least the modification and/or target portion of the code. The at least one programming language construct may additionally and/or alternatively be containerized for execution and/or deployment locally and/or at the continuous integration server.

At 808, the continuous integration emulator may execute the at least one programming language construct including the modification. The continuous integration emulator may execute the at least one programming language construct locally at the client device. This improves testing efficiency and reduces computing resources by, for example, eliminating the need to execute the entire continuous integration pipeline to test the modification, relying on bandwidth and/or the continuous integration server for execution of the continuous integration pipeline during testing of the code, reducing local computing memory requirements, and/or the like.

At 810, the continuous integration emulator may indicate whether the modification is successful. For example, the continuous integration emulator may determine whether at least the portion of the code, such as the at least one programming language construct including the modification and executed by the continuous integration emulator, was successful or if an error executes in at least the portion of the code. In other words, the continuous integration emulator may identify an error in the code of the continuous integration pipeline. Based on the error and/or the modification being unsuccessful, the continuous integration emulator may generate a recommendation for correcting the error and/or the modification. The continuous integration emulator may present, via the client device, the recommendation, the indication that the modification was successful or unsuccessful, the error, and/or the like.

In some embodiments, the continuous integration emulator generates a schematic representation of the continuous integration pipeline (e.g., at least the target portion) based at least on the parsed portion of the code of the continuous integration pipeline. The schematic representation may additionally and/or alternatively represent the execution of at least the parsed portion of the code. The continuous integration emulator may display the schematic representation at the client device. The schematic representation may easily and quickly illustrate the parsed portion of the code (e.g., the target portion) and/or the at least one programming construct executed by the continuous integration emulator during testing of the modification and/or at least the portion of the code.

In some embodiments, the continuous integration emulator may communicate with the continuous integration server. For example, the continuous integration emulator may update the continuous integration pipeline running on the continuous integration server to include the modification based on a determination that the modification is successful. Additionally and/or alternatively, the continuous integration emulator may update the continuous integration pipeline running on the continuous integration server to include one or more other modifications to at least the portion of the code via the continuous integration emulator.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory result in operations comprising: receiving, by a continuous integration emulator running locally on a client device, a modification to code of a continuous integration pipeline running on a continuous integration server in communication with the client device; parsing, by the continuous integration emulator, at least a portion of the code of the continuous integration pipeline; determining, by the continuous integration emulator, at least one programming language construct of at least the parsed portion of the code of the continuous integration pipeline; executing, by the continuous integration emulator and locally at the client device, the at least one programming language construct including the modification, wherein the executing emulates running of at least the portion of the code of the continuous integration pipeline on the continuous integration server; and indicating, by the continuous integration emulator and via the client device, whether the modification is successful.

Example 2: The system of example 1, wherein the operations further comprise: determining a programming language type of the code of the continuous integration pipeline; and wherein the parsing is based on the programming language type.

Example 3: The system of any of examples 1 to 2, wherein the operations further comprise: generating a schematic representation of the continuous integration pipeline based at least on the parsed portion of the code of the continuous integration pipeline and the executing; and displaying the schematic representation at the client device.

Example 4: The system of any of examples 1 to 3, wherein the determined at least one programming language construct is containerized for execution.

Example 5: The system of any of examples 1 to 4, wherein the operations further comprise: identifying an error in the code of the continuous integration pipeline; and generating a recommendation for correcting the error.

Example 6: The system of any of examples 1 to 5, wherein at least one programming construct includes at least one process to be invoked by the continuous integration emulator.

Example 7: The system of any of examples 1 to 6, wherein the operations further comprise: updating the continuous integration pipeline running on the continuous integration server to include the modification based on a determination that the modification is successful.

Example 8: A computer-implemented method comprising: receiving, by a continuous integration emulator running locally on a client device, a modification to code of a continuous integration pipeline running on a continuous integration server in communication with the client device; parsing, by the continuous integration emulator, at least a portion of the code of the continuous integration pipeline; determining, by the continuous integration emulator, at least one programming language construct of at least the parsed portion of the code of the continuous integration pipeline; executing, by the continuous integration emulator and locally at the client device, the at least one programming language construct including the modification, wherein the executing emulates running of at least the portion of the code of the continuous integration pipeline on the continuous integration server; and indicating, by the continuous integration emulator and via the client device, whether the modification is successful.

Example 9: The method of example 8, further comprising: determining a programming language type of the code of the continuous integration pipeline; and wherein the parsing is based on the programming language type.

Example 10: The method of any of examples 8 to 9, further comprising: generating a schematic representation of the continuous integration pipeline based at least on the parsed portion of the code of the continuous integration pipeline and the executing; and displaying the schematic representation at the client device.

Example 11: The method of any of examples 8 to 10, wherein the determined at least one programming language construct is containerized for execution.

Example 12: The method of any of examples 8 to 11, further comprising: identifying an error in the code of the continuous integration pipeline; and generating a recommendation for correcting the error.

Example 13: The method of any of examples 8 to 12, wherein at least one programming construct includes at least one process to be invoked by the continuous integration emulator.

Example 14: The method of any of examples 8 to 13, further comprising: updating the continuous integration pipeline running on the continuous integration server to include the modification based on a determination that the modification is successful.

Example 15: A non-transitory computer-readable medium storing instructions, which when executed by at least one data processor, result in operations comprising: receiving, by a continuous integration emulator running locally on a client device, a modification to code of a continuous integration pipeline running on a continuous integration server in communication with the client device; parsing, by the continuous integration emulator, at least a portion of the code of the continuous integration pipeline; determining, by the continuous integration emulator, at least one programming language construct of at least the parsed portion of the code of the continuous integration pipeline; executing, by the continuous integration emulator and locally at the client device, the at least one programming language construct including the modification, wherein the executing emulates running of at least the portion of the code of the continuous integration pipeline on the continuous integration server; and indicating, by the continuous integration emulator and via the client device, whether the modification is successful.

Example 16: The non-transitory computer-readable medium of example 15, wherein the operations further comprise: determining a programming language type of the code of the continuous integration pipeline; and wherein the parsing is based on the programming language type.

Example 17: The non-transitory computer-readable medium of any of examples 15 to 16, wherein the operations further comprise: generating a schematic representation of the continuous integration pipeline based at least on the parsed portion of the code of the continuous integration pipeline and the executing; and displaying the schematic representation at the client device.

Example 18: The non-transitory computer-readable medium of any of examples 15 to 17, wherein the determined at least one programming language construct is containerized for execution.

Example 19: The non-transitory computer-readable medium of any of examples 15 to 18, wherein the operations further comprise: identifying an error in the code of the continuous integration pipeline; and generating a recommendation for correcting the error.

Example 20: The non-transitory computer-readable medium of any of examples 15 to 19, wherein at least one programming construct includes at least one process to be invoked by the continuous integration emulator.

Figure 9:
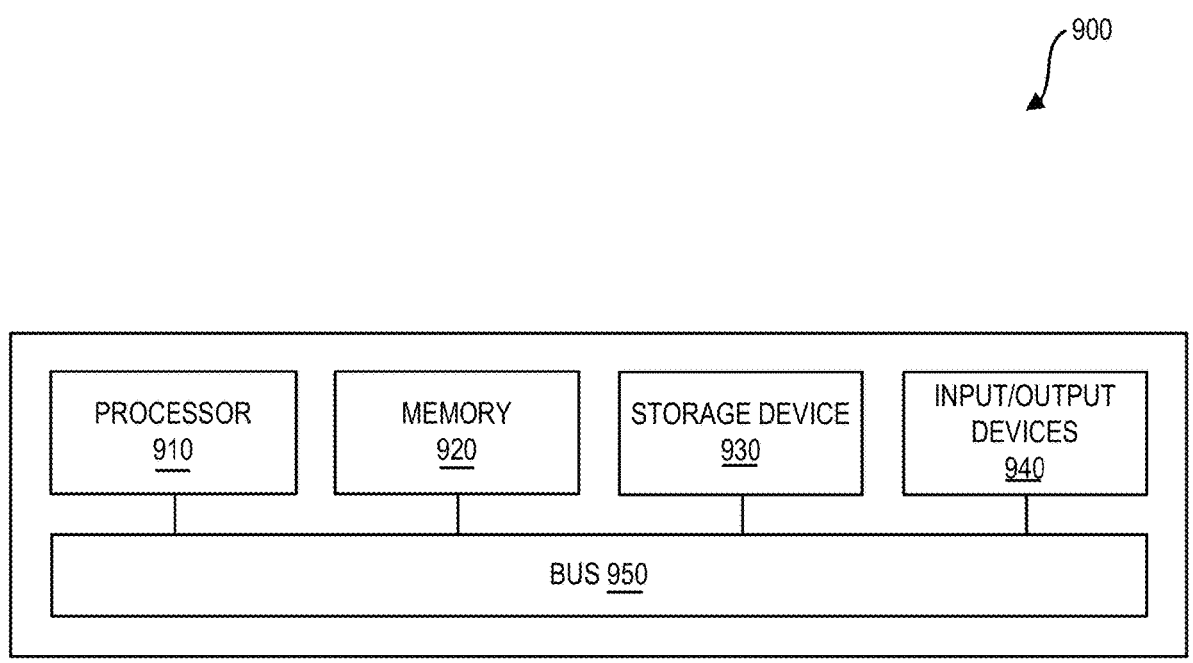
FIG. 9 depicts a block diagram illustrating an example of a computing system, in accordance with some example embodiments.

FIG. 9 depicts a block diagram illustrating a computing system 900, in accordance with some example embodiments. Referring to FIGS. 1-8, the computing system 900 can be used to implement the continuous integration emulator 110, the continuous integration system 100, and/or any components therein.

As shown in FIG. 9, the computing system 900 can include a processor 910, a memory 920, a storage device 930, and an input/output device 940. The processor 910, the memory 920, the storage device 930, and the input/output device 940 can be interconnected via a system bus 950. The processor 910 is capable of processing instructions for execution within the computing system 900. Such executed instructions can implement one or more components of, for example, the continuous integration emulator 110, the continuous integration system 100. In some implementations of the current subject matter, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a floppy disk device, a hard disk device, an optical disk device, or a tape device, or other suitable persistent storage means. The input/output device 940 provides input/output operations for the computing system 900. In some implementations of the current subject matter, the input/output device 940 includes a keyboard and/or pointing device. In various implementations, the input/output device 940 includes a display unit for displaying graphical user interfaces.

According to some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some implementations of the current subject matter, the computing system 900 can be used to execute various interactive computer software applications that can be used for organization, analysis and/or storage of data in various (e.g., tabular) format (e.g., Microsoft Excel®, and/or any other type of software). Alternatively, the computing system 900 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 940. The user interface can be generated and presented to a user by the computing system 900 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory result in operations comprising:
   receiving, by a continuous integration emulator running locally on a client device, a modification to code of a continuous integration pipeline running on a continuous integration server in communication with the client device;
   parsing, by the continuous integration emulator, at least a portion of the code of the continuous integration pipeline;
   generating a schematic representation of at least the parsed portion of the code using stored parts and stages of at least the parsed portion of the code;
   displaying, via the client device, the schematic representation of at least the parsed portion of the code;
   determining, by the continuous integration emulator, at least one programming language construct of at least the parsed portion of the code of the continuous integration pipeline;
   executing, by the continuous integration emulator and locally at the client device, the at least one programming language construct including the modification, wherein the executing emulates running of at least the portion of the code of the continuous integration pipeline on the continuous integration server; and
   indicating, by the continuous integration emulator and via the client device, whether the modification is successful.

2. The system of claim 1, wherein the operations further comprise:
   determining a programming language type of the code of the continuous integration pipeline; and
   wherein the parsing is based on the programming language type.

3. The system of claim 1, wherein the schematic representation provides an overview of at least the parsed portion of the code that has been executed by the continuous integration emulator.

4. The system of claim 1, wherein the determined at least one programming language construct is containerized for execution.

5. The system of claim 1, wherein the operations further comprise: identifying an error in the code of the continuous integration pipeline; and generating a recommendation for correcting the error.

6. The system of claim 1, wherein at least one programming construct includes at least one process to be invoked by the continuous integration emulator.

7. The system of claim 1, wherein the operations further comprise: updating the continuous integration pipeline running on the continuous integration server to include the modification based on a determination that the modification is successful.

8. A computer-implemented method, comprising:
   receiving, by a continuous integration emulator running locally on a client device, a modification to code of a continuous integration pipeline running on a continuous integration server in communication with the client device;
   parsing, by the continuous integration emulator, at least a portion of the code of the continuous integration pipeline;
   generating a schematic representation of at least the parsed portion of the code using stored parts and stages of at least the portion of the code;
   displaying, via the client device, the schematic representation of at least the parsed portion of the code;
   determining, by the continuous integration emulator, at least one programming language construct of at least the parsed portion of the code of the continuous integration pipeline;
   executing, by the continuous integration emulator and locally at the client device, the at least one programming language construct including the modification, wherein the executing emulates running of at least the portion of the code of the continuous integration pipeline on the continuous integration server; and
   indicating, by the continuous integration emulator and via the client device, whether the modification is successful.

9. The method of claim 8, further comprising: determining a programming language type of the code of the continuous integration pipeline; and wherein the parsing is based on the programming language type.

10. The method of claim 8, wherein the schematic representation provides an overview of at least the parsed portion of the code that has been executed by the continuous integration emulator.

11. The method of claim 8, wherein the determined at least one programming language construct is containerized for execution.

12. The method of claim 8, further comprising: identifying an error in the code of the continuous integration pipeline; and generating a recommendation for correcting the error.

13. The method of claim 8, wherein at least one programming construct includes at least one process to be invoked by the continuous integration emulator.

14. The method of claim 8, further comprising: updating the continuous integration pipeline running on the continuous integration server to include the modification based on a determination that the modification is successful.

15. A non-transitory computer-readable medium storing instructions, which when executed by at least one data processor, result in operations comprising:

receiving, by a continuous integration emulator running locally on a client device, a modification to code of a continuous integration pipeline running on a continuous integration server in communication with the client device;

parsing, by the continuous integration emulator, at least a portion of the code of the continuous integration pipeline;

generating a schematic representation of at least the parsed portion of the code using stored parts and stages of at least the portion of the code;

displaying, via the client device, the schematic representation of at least the parsed portion of the code;

determining, by the continuous integration emulator, at least one programming language construct of at least the parsed portion of the code of the continuous integration pipeline;

executing, by the continuous integration emulator and locally at the client device, the at least one programming language construct including the modification, wherein the executing emulates running of at least the portion of the code of the continuous integration pipeline on the continuous integration server; and indicating, by the continuous integration emulator and via the client device, whether the modification is successful.

16. The non-transitory computer-readable medium of claim 15, wherein the operations further comprise: determining a programming language type of the code of the continuous integration pipeline; and wherein the parsing is based on the programming language type.

17. The non-transitory computer-readable medium of claim 15, wherein the schematic representation provides an overview of at least the parsed portion of the code that has been executed by the continuous integration emulator.

18. The non-transitory computer-readable medium of claim 15, wherein the determined at least one programming language construct is containerized for execution.

19. The non-transitory computer-readable medium of claim 15, wherein the operations further comprise: identifying an error in the code of the continuous integration pipeline; and generating a recommendation for correcting the error.

20. The non-transitory computer-readable medium of claim 15, wherein at least one programming construct includes at least one process to be invoked by the continuous integration emulator.

* * * * *